United States Patent
Favilli et al.

(10) Patent No.: US 9,394,764 B2
(45) Date of Patent: Jul. 19, 2016

(54) METHOD AND AN APPARATUS FOR OBTAINING ENERGY BY EXPANDING A GAS AT A WELLHEAD

(75) Inventors: Stefano Favilli, Rosignano Marittimo (IT); Giacinto Leitempergher, Castelleone (IT); Luciano Scibola, Crema (IT)

(73) Assignee: SIME SRL, Rosignano Solvay (IT)

( * ) Notice: Subject to any disclaimer, the term of this patent is extended or adjusted under 35 U.S.C. 154(b) by 18 days.

(21) Appl. No.: 13/638,598

(22) PCT Filed: Mar. 29, 2011

(86) PCT No.: PCT/IB2011/000672
§ 371 (c)(1),
(2), (4) Date: Oct. 1, 2012

(87) PCT Pub. No.: WO2011/121424
PCT Pub. Date: Oct. 6, 2011

(65) Prior Publication Data
US 2013/0015669 A1    Jan. 17, 2013

(30) Foreign Application Priority Data
Mar. 29, 2010  (IT) ................. PI2010A0039

(51) Int. Cl.
| | |
|---|---|
| F02C 6/18 | (2006.01) |
| E21B 41/00 | (2006.01) |
| F01D 15/00 | (2006.01) |
| F03B 13/10 | (2006.01) |
| F03G 7/04 | (2006.01) |
| F02C 1/02 | (2006.01) |
| F17D 1/075 | (2006.01) |
| F02C 1/00 | (2006.01) |

(52) U.S. Cl.
CPC ............ *E21B 41/0085* (2013.01); *F01D 15/00* (2013.01); *F03B 13/10* (2013.01); *F03G 7/04* (2013.01); *F02C 1/00* (2013.01); *F02C 1/02* (2013.01); *F05B 2220/602* (2013.01);
(Continued)

(58) Field of Classification Search
CPC ............... F02C 1/00; F02C 1/02; F17D 1/075
USPC ................................... 290/1 R, 43
See application file for complete search history.

(56) References Cited

U.S. PATENT DOCUMENTS

| | | |
|---|---|---|
| 1,946,182 A | 2/1934 | Thompson |
| 3,140,855 A | 7/1964 | Williams et al. |

(Continued)

*Primary Examiner* — Tho D Ta
(74) *Attorney, Agent, or Firm* — Ladas & Parry LLP (57) ABSTRACT

A method and an apparatus (100) for reducing the pressure of a natural gas (2) at a wellhead of a natural gas field. The method provides prearranging an energy recovery expansion device (20), which comprises a stator and a rotor mechanically connected with a power generator (29), and a gas passageway between the rotor and the stator, and conveying the natural gas into the passageway of the energy recovery expansion device (24) to cause a rotation of the rotor and the expansion of the gas, the pressure being reduced from the extraction pressure ($P_1$) to the use pressure ($P_2$), which makes it possible to obtain an electric power (W) during the expansion, adapted to satisfy the energy requirements of the gas extraction unit, in particular of an offshore platform, without installing local electric generators. In order to allow a reliable operation of a recovery expansion device, such as a turbine, a means is provided for finely separating solid and liquid matter present in the gas, as well as a means (7) for conditioning the gas entering the expansion device, which may comprise a feeding means (12) of an additive into the gas (3), said additive adapted to decrease the formation temperature of the solid, and, in an advantageous way in case of higher amount of water, a means for heating the gas such that the temperature is maintained above the formation temperature of the solid.

20 Claims, 4 Drawing Sheets

(52) U.S. Cl.
CPC ............. *F05D2220/62* (2013.01); *F17D 1/075* (2013.01); *Y02B 10/50* (2013.01); *Y02E 10/22* (2013.01)

(56) References Cited

U.S. PATENT DOCUMENTS

| | | | |
|---|---|---|---|
| 3,749,162 A | 7/1973 | Anders | |
| 3,808,794 A | 5/1974 | Wood | |
| 4,324,563 A * | 4/1982 | Jones et al. | 48/62 R |
| 4,369,373 A | 1/1983 | Wiseman | |
| 5,003,782 A * | 4/1991 | Kucerija | 60/648 |
| 5,117,908 A | 6/1992 | Hofmann | |
| 5,685,154 A * | 11/1997 | Bronicki et al. | 60/648 |
| 6,563,228 B1 * | 5/2003 | Schlett | 290/2 |
| 6,998,724 B2 * | 2/2006 | Johansen et al. | 290/1 R |
| 7,833,298 B2 * | 11/2010 | Larnholm et al. | 55/337 |
| 8,008,794 B2 * | 8/2011 | Edenfeld | 290/44 |
| 8,256,219 B2 * | 9/2012 | Hinders et al. | 60/641.2 |
| 2005/0179263 A1 | 8/2005 | Johansen et al. | |
| 2006/0006656 A1 | 1/2006 | Smedstad | |

\* cited by examiner

METHOD AND AN APPARATUS FOR OBTAINING ENERGY BY EXPANDING A GAS AT A WELLHEAD

FIELD OF THE INVENTION

The present invention relates to a method and to an apparatus for reducing the pressure of a natural gas immediately after its extraction from a natural gas field, i.e. at a wellhead.

BACKGROUND OF THE INVENTION—TECHNICAL PROBLEMS

Natural gas is normally available from gas fields at a pressure up to hundreds of atmospheres. Such fields are often far from transformation sites; the wellheads may be located, for instance, on offshore platforms or in subsea facilities. For reducing gas transfer equipment and piping costs, it is normal practice to reduce the gas pressure immediately after its extraction. To this purpose lamination valves, also known as choke-valves, are normally used where the natural gas undergoes a constant-enthalpy pressure reduction process with high irreversibility rate, in which the potential energy associated with the pressure of the gas is dissipated by friction. Therefore, the expansion is associated with a net energy loss.

On the other hand, the extraction sites are usually located in remote places such as offshore platforms, far from the electric energy distribution networks. Electric generators, that are usually provided for electrically supplying on-site electric equipment, consume a part of the extracted gas and may involve relevant installation and maintenance costs. Therefore the need is felt of a cheaper energy source for feeding such equipment, advantageously by exploiting the energy released by the expansion of the gas.

Upstream of the lamination valves, a separation treatment is carried out to separate solid matter, such as sand, salt etc., as well as a treatment for separating liquids, such as oil and water. This treatment, which is complicated by the high pressure of the gas, takes place in a structurally simple equipment, and retains only the largest solid residues and most of the water contained in the gas, but cannot eliminate the finest particulate, and small liquid droplets, which can however flow through the expansion valve without damaging or blocking it, since the valve is made of a wear resistant material. Furthermore, the expansion is accompanied by a cooling effect whose extent depends upon the pressure fall and which can lead to the formation of ice and of solid compounds like hydrocarbon hydrates, a process that can be put under control by injecting specific additives into the gas. Such a gas treatment is not normally adapted to prevent damages that may occur when expanding a gas in such energy recovery devices as conventional turbines, owing to residues such as sand and small water droplets that are present in the gas, or to solid matter that can be formed during the expansion. The maintenance and reparation required as a consequence of such damages can affect in an industrially unacceptable way the gas extraction unit.

Various systems have been proposed for recovering energy from the expansion of a gas at a wellhead.

For example, U.S. Pat. No. 3,808,794 describes a method and an apparatus for using the pressure of oil and gas wells to operate a turbine, while balancing the pressure in the line downstream of the turbine. In particular, this is obtained by means of a turbine-bypass line that is equipped with a regulation valve operated by a turbine downstream pressure control means, in order to maintain such downstream pressure at a constant value even if fluctuations of the turbine discharge pressure take place.

U.S. Pat. No. 4,369,373 describes a method and an apparatus for generating electricity by a generator comprising a motor that is arranged at a wellhead and that is operated by a fluid produced by a well. By controlling the electric load connected to the generator, it is possible to control the force required for operating the motor and thereby the pressure reduction across the motor. The electricity produced by the generator may be used in a heating element arranged downstream of the motor, for heating the fluid and preventing it from freezing, or for heating a particular emulsion separator. In the case of wells that produce both gas and liquid, separate motors are provided, as well as a gas/liquid separator.

U.S. Pat. No. 5,117,908 describes an installation comprising a turbine that receives crude oil from a well and, at a discharge side of the turbine, a means for separating the crude oil into a non-gaseous component and a gaseous component; a means is also provided for transferring the two components to respective conveying devices that are coupled with the turbine such that they can be operated by the turbine, thereby exploiting the crude oil pressure reduction that occurs in the turbine; in particular the conveying means is fitted on a shaft in common with the turbine. In an exemplary embodiment, the common shaft is provided with a coupling to an auxiliary electric motor and/or to an electric generator that can be connected to a remote electric user.

US 2005/0179263 describes a system for generating electric power in a subsea installation, where a turbine is operatively connected to a flow line to be operated by a fluid that flows along such flow line, thus generating an electric power. At least one speed sensor is provided for measuring the speed of the turbine. This patent application specifically relates to control and safety measures, and to passive safety means of the subsea installation.

Such systems, even if they refer to conventional energy recovering expansion devices, such as turbines, do not solve the problem of a fine separation of solids and liquids that are present in the material extracted from the well, nor they solve the problem of preventing the formation of solid material during the expansion within the turbine.

U.S. Pat. No. 3,749,162 relates to a method and to an apparatus for carrying out operations of extraction from an oil underwater extraction site in a zone where a surface ice layer is likely to form, which can move with respect to the underwater extraction site. In an exemplary embodiment, the extraction site comprises a conventional expansion valve for reducing crude oil pressure, and a system for injecting a glycol in the crude oil upstream of the expansion valve, in order to prevent a formation of ice during the pressure reduction, which system may be associated with a device for heating the glycol itself.

SUMMARY OF THE INVENTION

It is therefore a feature of the present invention to provide a method and an apparatus for recovering energy from the expansion of a natural gas immediately after its extraction, which allows preventing wear and other mechanical damages in a suitable expansion equipment, such as a turbine of known type, for example a radial expansion turbine or a screw expander, due to solid and liquid matter that is contained in the natural gas as extracted, or that can be formed as a consequence of the expansion of the gas, such as ice and hydrocarbon hydrates.

It is also a feature of the present invention to provide such method and apparatus that allow using this energy for feeding an electric equipment associated with the wellhead, at a limited investment operation costs.

It is, furthermore, a feature of the present invention to provide such method and apparatus that allow recovering energy from the expansion of a natural gas at a wellhead, in case the gas contains even a considerable amount of a liquid such as water.

It is also a feature of the present invention to provide such method and apparatus, which allow the recovering energy from the expansion at the wellhead of both inland and offshore fields, in particular "sub-sea" fields, i.e. if the expansion occurs below the level of a water body.

These and other objects are achieved by an apparatus for reducing the pressure of a natural gas available at an extraction pressure at a wellhead of a natural gas field, the apparatus comprising:
- an energy recovery expansion device that is adapted to expand the natural gas until a use pressure is reached and that has a rotor rotatably arranged about an own axis, and a stator, wherein the rotor and the stator define a gas passageway,
- an electric power generator that is mechanically connected to the rotor of the energy recovery expansion device, so that the generator generates an electric power when a stream of the natural gas is conveyed in the passageway of the energy recovery expansion device making the rotor to rotate and causing the gas to expand;
- a means for extracting electric power generated by the generator, wherein the main feature of the apparatus is a treatment means, upstream of the expansion device, said treatment means comprising:
- a solid and/or liquid separation means for separating a solid and/or a liquid fraction that is present in the natural gas, and
- a gas-conditioning means that is adapted to prevent a formation of solids during said expansion, such that said natural gas is turned into a treated gas.

This overcomes the problem of a solid matter that could seriously damage the generator, such as sand and debris, as well as the problem of a solid matter that could block the generator, which is formed from the condensation of a liquid that is present in the gas and that can freeze during the expansion occurring in the generator. This makes it possible to effectively install a generator at a wellhead, which has been conceived but never taken into practice due to the above significant drawbacks, and also makes it possible to recover an electrical power by expanding the gas at the wellhead, without dissipating such a valuable source of energy. The recovered energy may be exploited, for instance, for feeding electrical equipment, instruments and auxiliary installations at the extraction site, without installing photovoltaic generators or thermal generators, the latter based on the combustion of a part of the extracted gas.

In particular, the invention allows remarkably reducing the risk of wear and other damages of the expansion apparatus, which may even be a conventional turbine, and also allows avoiding frequent maintenance operations. This is particularly useful in case of unmanned sites such as some offshore platforms; if specific accurate separation and conditioning treatments are not provided, these installation would require specific and expensive maintenance, and/or a limitation to the expansion of the gas should be provided, in order to prevent the formation of ice and/or hydrocarbon hydrates. Therefore, the apparatus provides an alternative solution to lamination valves, which are now substantially a worldwide practice, and a more effective solution than what is theoretically provided by the cited literature.

Advantageously, the conditioning means comprises an additive feeding means for feeding a substance, i.e. an additive, into the stream of the natural gas that is adapted to decrease the formation temperature of a solid matter from water present in the natural gas, in particular in combination with hydrocarbons of said natural gas, more in particular in combination with methane and/or ethane.

Such additive may be a substance that is adapted to decrease the freezing temperature of water.

In particular the feeding means is adapted to feed an alcohol or a glycol. More in particular, the feeding means is adapted to receive and feed methanol or ethylene glycol into the stream of the natural gas.

In an exemplary embodiment, the conditioning means comprises a heating means of the stream of the natural gas adapted to increase the temperature of the stream of the gas up to a predetermined temperature value, such that during the expansion down to the use pressure, the temperature of the treated gas remains above the formation temperature of the solid that would otherwise form starting from the water present in the gas, in particular the temperature of the treated gas remains above the freezing temperature of water.

This way, it is possible to select a suitable combination of an additive amount that is fed into the gas before the expansion, and of the heating power, i.e. of the temperature increase imposed to the gas before the expansion.

In fact, the supply of an additive for lowering the formation temperature of the solid is an effective practice, in particular, in case of an expansion involving a pressure drop lower than a prefixed value, responsive to the temperature at which the natural gas is available. In case of higher pressure drops, during the expansion the temperature drops to lower values and the formation of a larger amount of solid matter, in particular ice and hydrates, takes place for which the chemical additives are less effective. For pressure drops higher than a certain value, it is therefore necessary to resort to heating means, the higher the pressure drop, the higher the gain.

On the other hand, the additive feeding means for lowering the formation temperature of solids makes it possible to limit the energy consumption, in particular the consumption of electric energy in a heating means, as explained hereinafter, to the extent that the pressure drop is limited.

The contemporaneous presence of the heating means and of the means for feeding an additive adapted to decrease the formation temperature of the solid is therefore particularly advantageous if pressure drop changes are possible during the useful life of the well, as a consequence of a change of the extraction pressure, which occurs for substantially all the gas wells or gas fields, and/or as a consequence of a change of the use pressure. In other words, along the useful life of the well it is possible to select a proper combination of the additive amount and of the heating power.

Preferably, the heating means is an electric heating means that is adapted to be supplied with a fraction of the electric power that is generated by the electric power generator, the fraction of electric power forming the heating electric power that is required for carrying out the heating step. In this case, by feeding an additive for decreasing the solid formation temperature it is possible to suitably contain the energy recovery reduction, since the consumption of electric power to provide the heating power could become too relevant with respect to an advantageous energy recovery. Furthermore, the heating means downstream of the separation means helps to reduce the particle size and the amount of mist that remains in the treated gas.

In particular, the electric power fraction that is used to provide the heating power is less than 50% of the electric power generated by the generator during the expansion.

The heating means may be provided with a heating power adjusting means responsive to the temperature that is attained by the gas downstream of the heating means.

In alternative, the heating means may comprise a heat exchanger, where the heating power is supplied by a stream of a heating fluid, which for instance, in marine installations and according to the season, can be sea water, possibly heated sea water, taken from a platform cooling circuit.

The heating means may be arranged in series with respect to the additive feeding means, or can be arranged parallel with respect to the additive feeding means.

In an exemplary embodiment, an adjustment means can be provided of the flow rate of the additive that is adapted to decrease the formation temperature of a solid and/or a heating electric power adjustment means for adjusting the heating electric power according to the extraction pressure and/or to the use pressure.

In particular, said separation means comprises two consecutive stages, each stage possibly made of per se known means, wherein a first stage is a cyclone centrifugal separation stage of the solid, in particular comprising multiple cyclones, and the second stage is an inertial separation stage.

In particular, the inertial separation stage comprises at least one array of adjacent plates, i.e. wings, that are folded at an angle, and that are known in the art as "vane mist eliminator", to form a packing, in order to create a gas forced path among the wings in which many direction changes are provided, such that the droplets hit the wings and coalesce into larger droplets that collect by gravity in a dedicated collection pot. In particular, such separator, thanks also to the multiple cyclone system, can treat a gas that may contain even a significant amount of liquid; this is the case, for instance, of gas wells towards the end of their exploitation life, when entrained water and sand increase considerably, as well as of wells where C5+ hydrocarbons or "tar" is present in a considerable amount; the separator also allows a high separation efficiency, thanks to the forced-path inertial separator of the second stage.

In particular the two separation steps are housed in a vertical container that has an inlet lower port and an outlet upper port, and the first stage is arranged below the second stage. Such a separator is suitable for settling solid particles that mainly consist of sand, salts and various oxides such as rust, also in the high pressure conditions of a natural gas, and is also suitable for settling liquid particles of 15-microns or larger in size. In particular, the first step can separate droplets up to 25 microns in size, while the second stage, which may be equipped with packages known to a skilled person, allows separating droplets up to 15 microns in size. Furthermore, such a second step does not promote scale formation and provides low pressure drop.

Advantageously, the apparatus comprises a substantially isentropic expansion valve that is installed in parallel with respect to the energy recovery expansion device, and a diversion means for at least in part diverting the natural gas from the energy recovery expansion device to the expansion valve and vice-versa. For example, a substantially isentropic expansion valve may be a valve that comprises a tubular inlet portion, a tubular throat portion and a tubular outlet portion, said portions arranged in sequence; a closing element is arranged in the throat portion, adapted to cause an expansion and a Joule-Thomson cooling of a fluid, in particular of a natural gas that is available at a predetermined pressure, wherein a fluid directing means is provided within the inlet portion, such as channels arranged along the inner surface of the inlet portion of the valve, such that the gas follows a flow direction at an angle with respect to the longitudinal axis of the inlet portion, if it is desired to assist or enhance liquid separation while expanding the gas, by reducing the friction between the at least partially gaseous fluid and the throat portion at the closing element, thus approximating a reversible isentropic transformation more closely than what is possible with the known-type lamination valves. In particular, the fluid directing means imposes a swirling movement to the expanding gas. In particular, the closing element may be a substantially cylindrical hollow body coaxially connected to one end of a central element of the valve, opposite to the inlet port of the inlet portion, the cylindrical hollow body having a plurality of holes formed between an own outer cylindrical surface and an own inner cylindrical surface, where at least one part of the holes is arranged at respective channels of the inlet portion, in such a way that the gas that leaves a channel enters into a respective hole of the closing element, and gradually takes a substantially swirling direction that is maintained within an inner recess of the closing element and/or within the outlet portion of the valve.

By allowing a partially isentropic expansion, such a valve makes it possible to obtain an outlet liquid fraction depending upon the pressure drop and upon the temperature of the gas to be expanded, as well as upon the isentropic efficiency of the valve itself. This solution is advantageous in case of a gas that contains a considerable amount of hydrocarbons with more than two carbon atoms, which can provide a useful amount of liquid hydrocarbons by such a transformation. In particular, by adjusting the gas fractions that are caused to expand in the energy recovery expansion device and in the substantially isentropic expansion valve, an advantageous combination can be chosen between the recovered energy and the liquid fraction obtained by such respective expansion devices. In other words, by diverting a portion of the gas fluid from the energy recovery expansion device to the expansion valve, it is possible to obtain a partial production of electric energy, i.e. the production only of the amount that is needed for local requirements, without significantly reducing, or even increasing the production of liquid hydrocarbons.

If installed in parallel, the substantially isentropic expansion valve also allows adjusting/maintaining the flow rate of the gas that expands in the energy recovery expansion device, even in case of fluctuations of the flow rate of the gas produced by the gas field/by the well.

The apparatus may also comprise an expansion valve, i.e. a choke-valve, which is installed in parallel with respect to the energy recovery expansion device, with function of bypass with respect to the energy recovery expansion device, and a diversion means for at least in part diverting the natural gas from the energy recovery expansion device to the expansion valve and vice-versa. With expansion valve or choke-valve a valve is meant in which a substantially isenthalpic transformation takes place which has a high irreversibility rate. Thanks to such bypass valve, it is possible to maintain the energy recovery expansion device without stopping the extraction of the natural gas at the pressure of the natural gas field and its transfer through the natural gas pipeline at the use or transfer pressure. After the maintenance, the energy production can start again by excluding the choke valve.

The above-mentioned objects, and other objects, are also achieved by a method for reducing the pressure of a natural gas available at an extraction pressure at a wellhead of a natural gas field, comprising the steps of:

prearranging an energy recovery expansion device for expanding the natural gas until a use pressure is reached, the energy recovery expansion device having a rotor rotatably arranged about an own axis and a stator, and a natural gas passageway defined between the rotor and the stator;

connecting an electric power generator to the rotor of the energy recovery expansion device, so that a rotation of the rotor causes an electric power generation by the generator;

conveying a stream of the natural gas in the passageway of the energy recovery expansion device in such a way to cause a rotation of the rotor and to cause the expansion, the pressure of the gas decreasing from the extraction pressure to the use pressure;

extracting the electric power that is generated by the generator as a consequence of the rotation of the rotor, the main feature of the method being that treatment steps are provided, for the natural gas before the step of conveying, which comprise steps of:

separating solids and/or liquids, in particular water, which are present in the natural gas, and conditioning the natural gas in order to prevent a formation of a solid during the expansion in the rotor, transforming said natural gas into a treated gas.

The natural gas is normally available at an extraction pressure larger than 15 bar, in particular at an extraction pressure set between 15 and 300 bar, more in particular at an extraction pressure set between 35 and 250 bar.

The natural gas may contain water, in an amount that may range from traces, i.e. from an amount lower than 2-3 ppm, typically, if it has already been subjected to a TEG dehydration treatment, up to the saturation concentration, which corresponds to the conditions at which the gas is available, or even up to a concentration value higher than the saturation concentration.

The natural gas that leaves the separator may contain moisture substantially up to the saturation concentration which depends upon the temperature, the pressure and the quality of the gas, for example up to about 200 ppm, and the subsequent step of conditioning comprises a step of feeding an additive that is adapted to decrease the solid formation temperature in the natural gas stream upstream of the energy recovery expansion device. In particular, the additive is adapted to decrease the freezing temperature of the water that is contained in the natural gas. Preferably the additive for lowering the solid formation temperature is an alcohol or a glycol, in particular the additive is selected from the group comprised of methanol and ethylene glycol. This procedure is particularly advantageous if the gas contains a low amount of moisture and, in any case, if the gas contains a low amount of solids, since it makes it possible to carry out the expansion of the natural gas in substantially any expansion device.

The step of conditioning may comprise a step of heating the stream of the natural gas to increase the temperature of the stream of the natural gas up to a predetermined temperature value, such that, during the expansion to the use pressure, the temperature of the treated gas remains above the formation temperature of a solid which would otherwise be formed starting from the water present in the gas, in particular the temperature of the treated gas remains above the freezing temperature of water. This is particularly advantageous if the natural gas contains only traces of free water, for example if the gas has already been subjected to a water separation treatment, and if during the expansion of the gas, as extracted, the temperature reaches a formation temperature of a solid starting from the water, for example the formation temperature of ice or of hydrocarbon hydrates.

Preferably, the thermal power that is required for performing the step of heating is obtained as a fraction of the electric power that is generated by the generator, by transferring such power fraction to a device that is adapted to carry out the step of heating.

In particular, the fraction of the electric power is less than the 50% of the recovered power.

In a particular exemplary embodiment, the natural gas field is accessible from an underwater floor of a water body, for example a sea or lake water body, and the above-described apparatus is arranged at a underwater position in the water body, in particular it is fixed to or upon the underwater floor. This way, even for fields that are available at a considerable subsea depth, it is possible to limit the overall length of the heavy piping, which is required by the considerable pressure, since the path through which the gas flows at a pressure close to the natural gas field pressure is minimum, and it is also possible to use relatively light piping to reach the offshore platform or the coast, exploiting most part of the pressure energy that would otherwise be lost.

BRIEF DESCRIPTION OF THE DRAWINGS

The invention will be made clearer with the following description of an exemplary embodiment thereof, exemplifying but not limitative, with reference to the attached drawings, in which.

DESCRIPTION OF PREFERRED EXEMPLARY EMBODIMENTS

Figure 1:
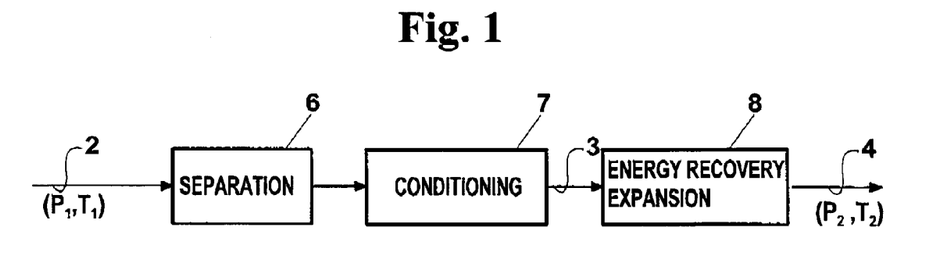
FIG. 1 shows a block diagram of the method and of the apparatus according to the invention.

In FIG. 1 shows a block diagram of the method and of an apparatus for reducing the pressure of a natural gas 2 extracted from a natural gas field at a pressure $P_1$ and at a temperature $T_1$, according to the invention, until a use and/or transport pressure $P_2$ is reached. Pressure $P_1$ of natural gas 2 may range between tenths and hundreds of atmospheres, in particular between 15 and 300 bar, more in particular between 35 and 250 bars. The method comprises a step 2 of treating a natural gas in a separation means 6 for separating solid and/or liquid particles that are present in natural gas 2, and a treatment step by a conditioning means 7 of natural gas 2 to obtain a treated gas 3, in order to preventing the formation of a solid during the subsequent expansion step to use pressure $P_2$.

Figure 2:
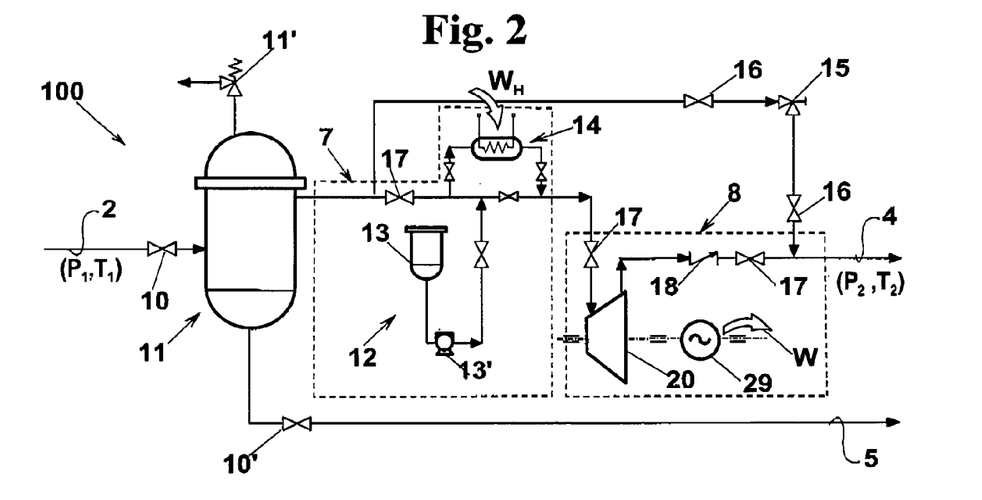
FIG. 2 shows a diagrammatical view of an apparatus for reducing the pressure of a natural gas at the wellhead.

With reference to FIG. 2, an apparatus 100 is described according to an exemplary embodiment of the invention. In this exemplary embodiment, the separation means 6 (FIG. 1) comprises a container-housed separator, for example a cyclone separator 11 into which natural gas 2 enters as extracted from the wellhead, and in which a separation takes place of:

rough and small-size solid and liquid impurities 5 consisting of water, sand and other solid or liquid matter, which are continuously or discontinuously collected and extracted by properly actuating a valve 10';

a natural gas stream 2, which contains moisture and solid residues after the treatment that is carried out within separator 11.

Separator 11 has a safety valve 11'. A shut-off valve 10 allows stopping the natural gas flow into separator 11, for example in case of maintenance of the extraction line.

In the exemplary embodiment shown in FIG. 2, an expansion means is provided 8 (FIG. 1) comprising an energy recovery expansion device 20 where treated natural gas 3, once treated in separator 11 and by conditioning means 7, is expanded and turns into an expanded gas stream 4 whose pressure $P_2$ is lower than pressure $P_1$ of treated gas 3, and is a use pressure suitable for conveying the gas to a further treatment unit, to a finishing unit or to a user, not shown, through a natural gas pipeline; in other words, a pressure is chosen which requires an economically acceptable thickness of the pipes of the natural gas pipeline, and of other equipment. In particular, the outlet pressure $P_2$ may be advantageously selected between about 10 and about 30 bar, or even higher pressures, responsive to various conditions such as the distance to the gas distribution network, the need of conditioning treatments and of other treatments.

The rotor of energy recovery expansion device 20 is mechanically connected to an electric power generator 29, in order to operate this generator and to generate electric energy. Energy is therefore recovered from the expansion of natural gas 2 as an electric power W, which can be used to satisfy the energy requirements of the gas extraction unit, in particular of an offshore platform, without either burning any extracted gas, or prearranging an energy conversion means to this purpose.

Expanded gas 4 has substantially the same composition of treated gas 3, which is fed to energy recovery expansion device 20, and is therefore a mixture of hydrocarbons that comprise mainly methane but that may also comprise higher hydrocarbons that are possibly separated in a further treatment/finishing unit to which the gas is sent.

The expansion which takes place in energy recovery expansion device 20 is accompanied, according to Joule-Thomson effect, by a cooling from temperature $T_1$ to a temperature $T_2 < T_1$. If temperature $T_2$, which depends upon prefixed pressure $P_2$ and upon gas and transformation features, is maintained by the conditioning device upstream of the expansion device, at a value higher than a determinate temperature threshold, the water present in the natural gas neither solidify into ice, nor binds with the hydrocarbons present in the raw gas and doesn't form solid hydrates.

In the exemplary embodiment shown in FIG. 2, conditioning means 7 comprises a means 12 for feeding an amount of a liquid or nebulised additive into the stream of the natural gas, in particular into the natural gas after separating impurities 5, the additive being adapted to decrease the freezing temperature of the gas. Feeding means 12 may comprise a reservoir 13 and a feed pump 13', and possibly conventional means for dosing the additive at a predetermined flow rate, not shown. The additive can be a glycol or an alcohol, in particular methanol; in the latter case, the reservoir is adapted to contain a pressure due to vapours formed from liquid methanol, and is equipped with tank overpressure protection means as well.

In the exemplary embodiment shown in FIG. 2, conditioning means 7 comprise also a heating means 14 for heating the natural gas stream in order increase the temperature of the natural gas up to a such a value, that while flowing through expansion device 20, the temperature of treated gas 3, even decreasing, is maintained at a value higher than the formation temperature of any solid matter that could otherwise form from the water present in the gas, in particular the temperature of the gas remains higher than the freezing temperature of water.

Figure 4:
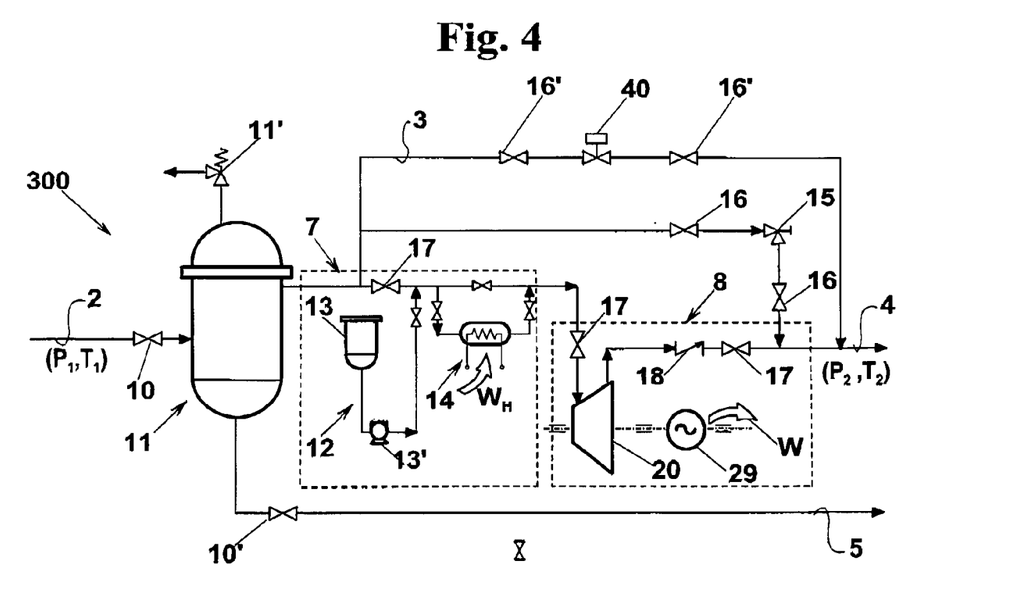
FIG. 4 is a flow-sheet diagram that illustrates an embodiment of the method and of the apparatus according to the invention, wherein a substantially isentropic expansion valve is provided in parallel with respect to the energy recovery expansion device.
Figure 8:
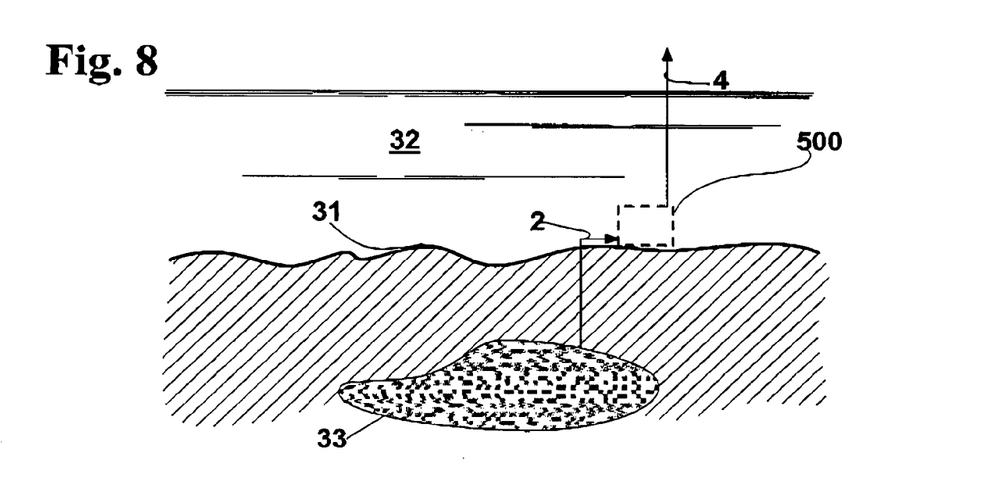
FIG. 8 shows an undersea application of the apparatus according to the invention.

Even if in FIG. 2, and in following FIGS. 4 and 8, conditioning means 7 comprise both a means 12 for feeding an additive for preventing the formation of a solid, and a heating means 14, means 12 and 14 may be provided independently from each other, in particular only heating means 14 may be provided if the expansion of the natural gas occurs with higher pressure drops, whereas only the additive feeding means may be provided in case of lower pressure drops.

Even if in FIG. 2, and in following FIGS. 4 and 8, additive feeding means 12 and heating means 14 are arranged into respective reciprocally parallel pipes, and are associated with valves, not represented, for parting the gas flow extracted from the well into the two branches, means 12 and 14 may also be arranged in series, i.e. they may be arranged along a same duct in which a same flow rate of natural gas flows.

In FIG. 2 an expansion valve 15 is also shown which is installed in parallel with respect to energy recovery expansion device 20. Furthermore, valves 16,17 are provided for diverting the natural gas from energy recovery expansion device 20 to expansion valve 15 and vice-versa. Valves 16,17 may be simple, preferably remotely operated shut-off valves, in order to allow maintenance of energy recovery expansion device 20 without stopping the natural gas 2 extraction at the natural gas field pressure $P_1$ and the transfer of expanded gas 4 obtained therefrom in a natural gas pipeline, at transport pressure $P_2$. Valves 16,17 may also comprise at least one regulation valve for adjusting the flow rate of portions of treated gas 3 stream that flow through expansion valve 15 and energy recovery expansion device 20, respectively. A check valve 18 is also shown on the delivery side of energy recovery expansion device 20.

Figure 3:
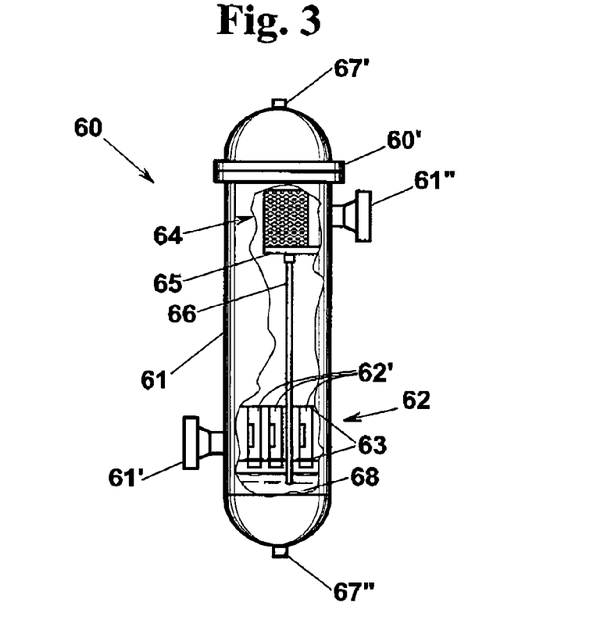
FIG. 3 diagrammatically shows a two stages device for separating solids and liquids that are contained in the natural gas.

The separation means 11 of solid and liquid contained in natural gas 2 may comprise a two-stage separator 62,64, as shown in FIG. 3. A first stage 62 is a centrifugal separation stage of the solid and/or liquid which comprises multiple cyclones 62', and a second stage 64 is an inertial separation stage for separating substantially only liquid matter, comprising a plurality of multifolded plates that are arranged adjacent to one another to form a pile 64. The second step may comprise packages of a type that is well-known to a skilled person, such as Alphamist V-H11 or VH-2 packages, Vane Mist Eliminator packages, or the like.

In a two-stage separator 60 according to the exemplary embodiment of FIG. 3, two steps 62,64 are housed in a same vertical elongated container 61, where first stage 62 is arranged below second stage 64. Separator 60 comprises an inlet nozzle 61' for natural gas 2, at which a plurality of cyclones 62' is housed inside container 61, which cyclones have a well-known configuration with respective tangential inlet nozzles made through a outer cylindrical shell and an annular chamber arranged about a inner cylindrical body, wherein the outer shell and the annular chamber are tapered into a collection conical member for collecting liquid and solid matter separated in the annular chamber, which has a lower outlet port towards a collection pot 68 that is arranged in a lower portion of container 61. The upper part of the annular chamber of each cyclone ends in an upper outlet port for a gas that still contains the smallest particles of liquid; such gas rises up to pile 64 that is mounted in an upper portion of container 61 in order to provide a gas forced passage towards an outlet nozzle 61". While the gas flows through pile 64, the residual liquid droplets of the gas hit on the plates after each direction change, and coalesce into larger droplets that collect along the wings and fall down by gravity. Pile 64 is mounted on a support 65 to which a collection pot is associated for collecting the residual liquid; this pot communicates with a drain pipe 66, which prevents the liquid separated in pile 64 from coming into contact with the gas that flows upwards the central portion of container 61 between the outlet ports of cyclones 62' and pile 64. The drain pipe ends at collection pot 68 where the liquid separated in second stage 64 is joined with the material separated in the first stage. In the lower bottom of the container a connection 67" is provided, typically a pipe socket or more frequently a nozzle of at least 1½" diameter, for connecting a duct in order to empty collection pot 68 and to avoid excessive collection of material separated by separator 60, i.e. by separation means 11 (FIG. 2); a similar connection 67' can be provided in the upper bottom, which is preferably connected to the body of container 61 by the couple of flange 6", to connect a safety valve 11' (FIG. 2). A bleed connection/line may also be provided to be used when decontaminating the equipment before maintaining it.

In FIG. 4 an apparatus 300 is shown according to an exemplary embodiment of the invention, wherein a substantially isentropic expansion valve 40 is installed in parallel with respect to energy recovery expansion device 20. Valves 16',17 are furthermore provided for diverting the natural gas from energy recovery expansion device 20 to substantially isentropic expansion valve 40 and vice-versa. This way, it is possible to direct a portion of treated gas 3 from an expansion within energy recovery device 20 to an expansion within expansion valve 40, which, if the gas contains a considerable amount of higher hydrocarbons, makes it possible to obtain liquid hydrocarbons, provided a portion of the recovered energy is renounced. Valves 16',17 may be simple, preferably remotely operated shut-off valves, or may also comprise at least one regulation valve for adjusting the flow rate of portions of treated gas 3 that flows through substantially isentropic expansion valve 40 and through energy recovery expansion device 20. Furthermore, a check valve 18 is shown on the delivery side of energy recovery expansion device 20. Besides, FIG. 4 shows an expansion valve 15 that is installed in parallel with respect to expansion devices 20,40, and that, however, might not be indispensable, since expansion valve 40 may work as a bypass means with respect to energy recovery expansion device 20.

Figure 5:
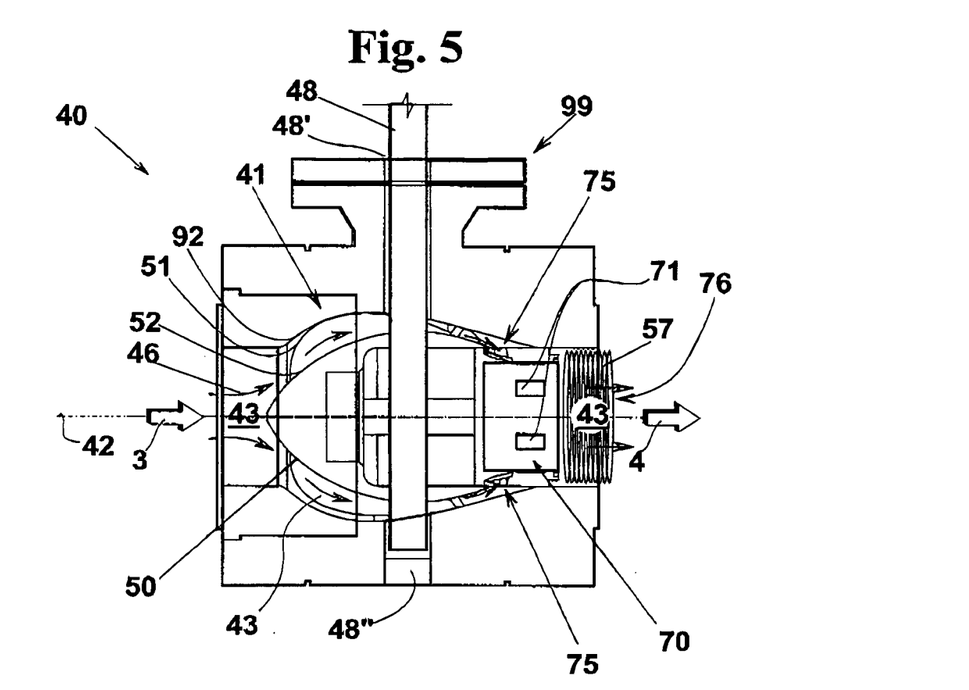
FIG. 5 is a cross sectional view of a substantially isentropic expansion valve for expanding of the gas, according to another exemplary embodiment of the invention.

With reference to FIG. 5, a substantially isentropic expansion valve 40 is described, which comprises a passageway 43 that consists of, in the order, by a tubular inlet portion 41, by a tubular throat portion 75 and by a tubular outlet portion 76. Substantially isentropic expansion valve 40 has a closing element 70 that is arranged within throat portion 75, and is adapted to cause an expansion and a Joule-Thomson cooling of an at least partially gaseous fluid, for example of treated natural gas 3, which enters into valve 40 substantially at extraction pressure $P_1$. In inlet portion 41, a means is provided for orienting treated gas 3, such as channels 44, whose evolution can be seen in FIG. 6, and which are arranged along the inner surface of the inlet portion of the valve, such that the gas follows a flow direction 46 normally at an angle with respect to the longitudinal axis 42 of inlet portion 41, in order to reduce the friction between gas 3 and throat portion 75 at closing element 70. Preferably, in case of considerable formation of liquid, as shown in FIG. 7, channels 44 impose a swirling movement to expanding gas 3.

From inlet zone 42 to inlet zone 75 the gas, besides being oriented by the wings or by the orientation means 44, progressively increases its speed, typically, until a substantially sonic speed is reached.

Figure 6:
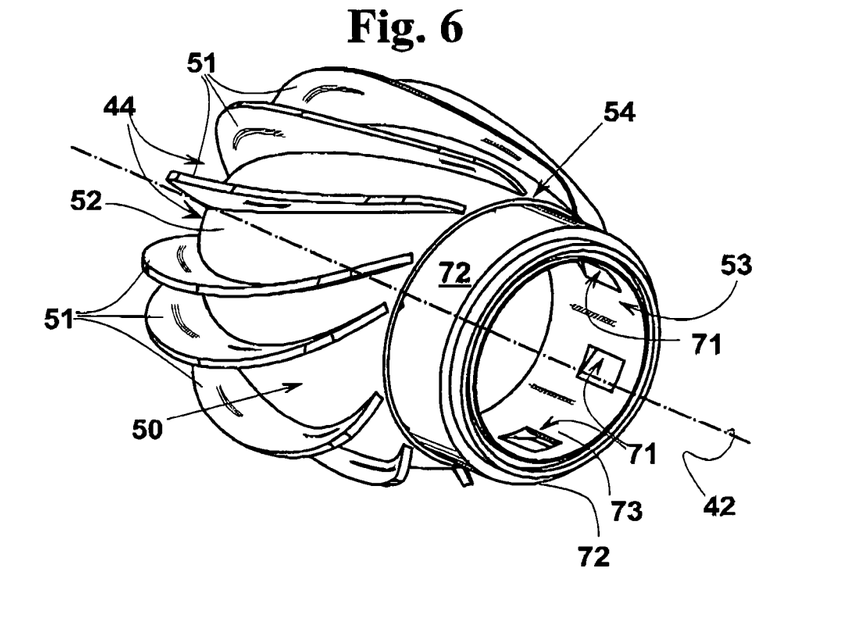
FIG. 6 is a perspective view of a closing element of the substantially isentropic expansion valve of FIG. 5.
Figure 7:
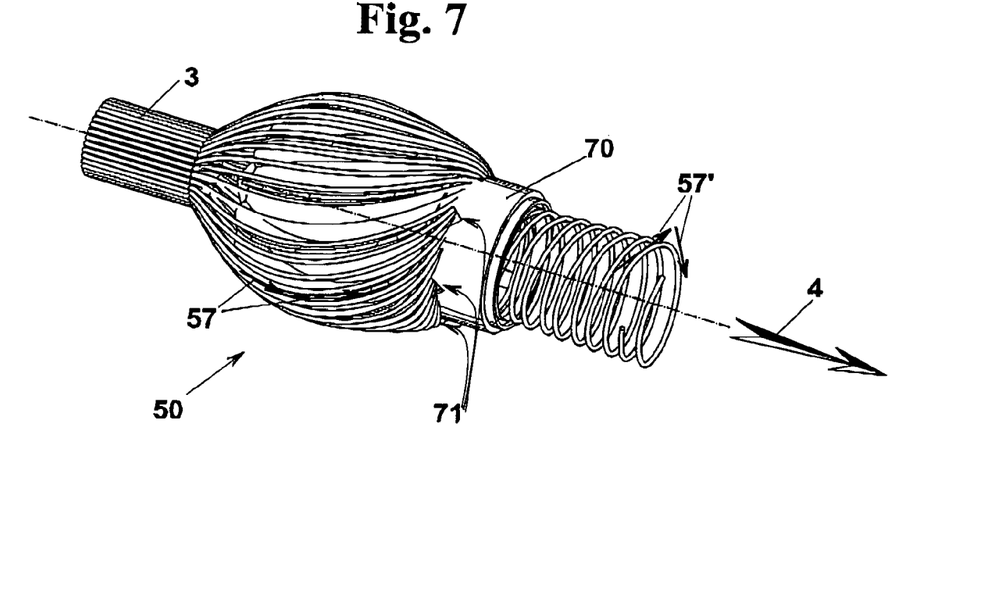
FIG. 7 diagrammatically shows the evolution of the fluid threads of a gas expanding through the substantially isentropic expansion valve of FIG. 5.

In the exemplary embodiment shown in detail in FIG. 6, closing element 70 is a substantially cylindrical hollow body, which is coaxially connected to one end 54 of a central element 50 of valve 40, opposite to an inlet port 41' of the inlet portion of valve 40. The cylindrical hollow body has a plurality of holes 71 between an own outer cylindrical surface 72 and an own inner cylindrical surface 73, at least one part of the holes is arranged at respective channels 44 of the inlet portion; this way, gas 3 that leaves a channel and enters into a respective hole 71 of closing element 70 gradually takes a substantially swirling direction, and maintains it within an inner recess 74 of hollow closing element 70 and/or within the outlet portion 76 of valve 50.

In FIG. 8 a natural gas field 33 is shown which is accessible from an underwater floor 31 of a water body 32, for example of a sea or a lake water body, and an apparatus 500 comprising energy recovery expansion device 20 and generator 29 both arranged at a underwater position of water body 32, in this case in a position upon underwater floor 31.

The foregoing description of embodiments of the method and of the apparatus according to the invention will so fully reveal the invention according to the conceptual point of view, so that others, by applying current knowledge, will be able to modify and/or adapt for various applications such embodiments without further research and without parting from the invention, and it is therefore to be understood that such adaptations and modifications will have to be considered as equivalent to the specific embodiment. The means and the materials to perform the different functions described herein could have a different nature without, for this reason, departing from the field of the invention. It is to be understood that the phraseology or terminology that is employed herein is for the purpose of description and not of limitation.

The invention claimed is:

1. An apparatus for reducing the pressure of a fluid comprising a natural gas, water, and solid residues, said fluid being available at an extraction pressure at a wellhead of a natural gas field and for recovering energy directly from said natural gas at said wellhead, said apparatus comprising:
    a vertical elongated container having an inlet nozzle for said fluid for connection with said wellhead and an outlet nozzle for a treated natural gas, said outlet nozzle above said inlet nozzle in said vertical elongated container;
    a cyclone centrifugal separation stage arranged in said vertical elongated container at said inlet nozzle, said cyclone centrifugal separation stage configured for separating said water and solid residues from said natural gas of said fluid,
    an inertial separation stage arranged in said vertical elongated container at said outlet nozzle for separating liquid droplets and mist from the gas, a gas-conditioning means arranged downstream of said outlet nozzle and configured to prevent a formation of ice in said natural gas during a subsequent expansion in a rotor, an energy recovery expansion device arranged downstream of said gas-conditioning means for expanding said natural gas until a use pressure is reached, said energy recovery expansion device having said rotor rotatably arranged about an own axis and a stator, and a gas passageway defined between said rotor and said stator;

an electric power generator that is mechanically connected to said rotor of said energy recovery expansion device, so that said electric power generator can generate an electric power when a stream of said natural gas exiting from said wellhead is conveyed in said passageway of said energy recovery expansion device, thus causing a rotation of said rotor and causing the gas to expand; and an electric power extraction means for extracting said electric power generated by said electric power generator.

2. An apparatus according to claim 1, wherein said additive feeding means comprises an additive flow rate adjustment means that is adapted to decrease the formation temperature of a solid and/or a heating electric power adjustment means for adjusting said heating electric power according to said extraction pressure and/or to said use pressure.

3. An apparatus according to claim 1, comprising a substantially isentropic expansion valve that is installed in parallel with respect to said energy recovery expansion device, and a diversion means for at least in part diverting said natural gas from said energy recovery expansion device to said expansion valve and vice-versa.

4. An apparatus according to claim 1, comprising an expansion valve that is installed in parallel with respect to said energy recovery expansion device, and a diversion means for at least in part diverting said natural gas from said energy recovery expansion device to said expansion valve and vice-versa.

5. An apparatus according to claim 1, wherein said cyclone centrifugal separation stage of the solids comprises multiple cyclones.

6. An apparatus according to claim 1, wherein said inertial separation stage comprises a plurality of multi-folded plates that are arranged adjacent to one another to form a pile.

7. An apparatus according to claim 1, wherein said conditioning means comprises an additive feeding means for feeding an additive into said stream of said natural gas, said additive adapted to decrease the formation temperature of a solid from water present in said natural gas, in particular in combination with a hydrocarbon compound of said natural gas, more in particular in combination with methane and/or ethane.

8. An apparatus according to claim 7, wherein said additive feeding means is adapted to feed an additive selected from the group comprised of: an alcohol and a glycol.

9. An apparatus according to claim 7, wherein said additive feeding means is adapted to feed an additive selected from the group comprised of: methanol and ethylene glycol.

10. An apparatus according to claim 1, wherein said conditioning means comprises a heating means of said stream of said natural gas adapted to increase the temperature of said stream of said natural gas up to a predetermined temperature value, such that during said expansion up to said use pressure, the temperature of said treated gas remains above the formation temperature of a solid that may be formed starting from water present in said natural gas, in particular in combination with a hydrocarbon compound of said natural gas, such that the temperature of said treated gas remains above the freezing temperature of water.

11. An apparatus according to claim 10, wherein said heating means is an electric heating means that is adapted to be supplied with a fraction of said electric power generated by said electric power generator, said fraction of electric power forming a heating electric power.

12. A method for reducing the pressure of a fluid comprising a natural gas, water, and solid residues, said fluid being available at an extraction pressure at a wellhead of a natural gas field and for recovering energy directly from said natural gas at said wellhead, comprising the steps of:

prearranging a vertical elongated container having an inlet nozzle for said fluid for connection with said wellhead and an outlet nozzle for a treated natural gas, said outlet nozzle above said inlet nozzle in said vertical elongated container;

prearranging a cyclone centrifugal separation stage arranged in said vertical elongated container at said inlet nozzle, said cyclone centrifugal separation stage configured for separating said water and solid residues from said natural gas of said fluid, prearranging an inertial separation stage arranged in said vertical elongated container at said outlet nozzle for separating liquid droplets and mist from the gas, prearranging a gas-conditioning means arranged downstream of said outlet nozzle and configured to prevent a formation of ice in said natural gas during a subsequent expansion in a rotor, prearranging an energy recovery expansion device arranged downstream of said gas-conditioning means for expanding said natural gas exiting from said wellhead until a use pressure is reached, said energy recovery expansion device having said rotor rotatably arranged about an own axis and a stator, and a gas passageway defined between said rotor and said stator;

connecting an electric power generator to said rotor of said energy recovery expansion device, so that a rotation of said rotor causes an electric power generation by said generator;

conveying a stream of said fluid exiting from said wellhead in said inlet nozzle for separating said water and solid residues from said natural gas of said fluid in said cyclone centrifugal separation stage, and then conveying said natural gas in said vertical elongated container up to said inertial separation stage for separating liquid droplets and mist from the natural gas and up to said outlet nozzle;

conditioning said natural gas exiting from said outlet nozzle in said gas-conditioning means for preventing a formation of ice in said natural gas during said subsequent expansion, conveying said natural gas in said passageway of said energy recovery expansion device in such a way to cause a rotation of said rotor and to cause said expansion, the pressure of said gas decreasing from said extraction pressure to said use pressure;

extracting said electric power that is generated by said generator as a consequence of said rotation of said rotor.

13. A method according to claim 12, wherein said step of conditioning comprises a step of feeding an additive that is adapted to decrease said solid formation temperature, in said natural gas stream upstream of said energy recovery expansion device.

14. A method according to claim 12, wherein said additive is an additive that is adapted to decrease the freezing temperature of said water.

15. A method according to claim 12, wherein said additive is selected from the group comprised of an alcohol and a glycol.

16. A method according to claim 12, wherein said additive is selected from the group comprised of methanol and ethylene glycol.

17. A method according to claim 12, wherein said natural gas field is accessible from an underwater floor of a water body, and a step is provided of arranging said energy recovery expansion device and said electric power generator in a underwater position of said water body, in particular upon said underwater floor.

18. A method according to claim 12, wherein said step of conditioning comprises a step of heating said stream of said natural gas to increase the temperature of said stream of said natural gas up to a predetermined temperature value, such that, during said expansion down to said use pressure, the temperature of said treated gas remains above the formation temperature of a solid that may be formed starting from water present in said natural gas, in particular in combination with a hydrocarbon compound of said natural gas, more in particular in combination with methane and/or ethane, in particular such that the temperature of said treated gas remains above the freezing temperature of water.

19. A method according to claim 18, wherein a step is provided of removing a fraction of said electric power, and a step of transferring said fraction of said power to a device that is adapted to carry out said step of heating.

20. A method according to claim 19, wherein said fraction of said electric power is less than 50% of the recovered power.

* * * * *